(12) United States Patent
Svanebjerg

(10) Patent No.: US 12,391,405 B2
(45) Date of Patent: Aug. 19, 2025

(54) METHOD AND SYSTEM FOR DISPENSING FLUID ONTO AN AIRPLANE SURFACE

(71) Applicant: VESTERGAARD COMPANY A/S, Roskilde (DK)

(72) Inventor: Elo Svanebjerg, Roskilde (DK)

(73) Assignee: VESTERGAARD COMPANY A/S, Roskilde (DK)

( * ) Notice: Subject to any disclaimer, the term of this patent is extended or adjusted under 35 U.S.C. 154(b) by 0 days.

(21) Appl. No.: 18/578,348

(22) PCT Filed: Jul. 8, 2022

(86) PCT No.: PCT/EP2022/069180
§ 371 (c)(1),
(2) Date: Jan. 11, 2024

(87) PCT Pub. No.: WO2023/285324
PCT Pub. Date: Jan. 19, 2023

(65) Prior Publication Data
US 2024/0308690 A1   Sep. 19, 2024

(30) Foreign Application Priority Data
Jul. 13, 2021  (EP) ..................................... 21185326

(51) Int. Cl.
*B64F 5/23*  (2017.01)

(52) U.S. Cl.
CPC ...................................... *B64F 5/23* (2017.01)

(58) Field of Classification Search
CPC .......................................................... B64F 5/23
See application file for complete search history.

(56) References Cited

U.S. PATENT DOCUMENTS

| | | | | |
|---|---|---|---|---|
| 5,904,321 | A * | 5/1999 | Cox ........................... | B64F 5/23 203/18 |
| 9,796,089 | B2 * | 10/2017 | Lawrence, III ........ | B25J 9/1697 |
| 2015/0232201 | A1 * | 8/2015 | Walsh ....................... | B64F 5/23 702/50 |
| 2018/0093783 | A1 * | 4/2018 | Mæland .................... | B64F 5/30 |

FOREIGN PATENT DOCUMENTS

WO    WO-2011007200 A1 *  1/2011  ............ B64F 5/0063

* cited by examiner

*Primary Examiner* — Justin M Benedik
(74) *Attorney, Agent, or Firm* — SOROKER AGMON NORDMAN RIBA

(57) ABSTRACT

A method for applying a fluid, such as deicing fluid, to a surface of an airplane. A vehicle loaded with a fluid has a nozzle for spraying said fluid onto said surface and at least one sensor and a processing unit is provided for determining a 3D representation of the surface onto which fluid is to be added. The 3D representation is used to determine boundary conditions for a path along which the nozzle is moved relative to the surface and the fluid is being dispensed onto the surface as said nozzle is being moved along the path.

14 Claims, 4 Drawing Sheets

METHOD AND SYSTEM FOR DISPENSING FLUID ONTO AN AIRPLANE SURFACE

The present invention relates to the field of aviation more specifically to a method of treatment and maintenance of an aircraft, an example of such treatment is de-icing of the airplane.

In the field of aviation and especially commercial aviation for both travel and shipping, minimizing the amount of time an airplane is on the ground rather than in the air is beneficial both for efficient use of the airplane capacity and due to limits on airport capacity. However, time on the ground is necessary for the purposes of on—and off-loading as well as maintenance.

Several maintenance tasks require the dispensing of a fluid onto at least parts of the airplane. This could for example be for the cleaning of the windshield of the airplane or for de-icing of the wings or other parts of the airplane. While speed is important in such tasks so is thorough execution as the surfaces must be properly treated while care must be taken to avoid collisions between the dispensing system and the airplane and at the same time visibility of the surfaces to be treated may be poor due to both distances and weather conditions. Because of this, the operators needed must be skilled. The number of suited operators is thus limited, and training of new operators is time-consuming and expensive.

It is known in the art to assist the operators in some respects using sensors. For example, cameras may be used to send images to a monitor/display and help the operator with visibility of surfaces that it might otherwise be hard to see. Distance sensors have also been implemented to help minimise the risk of collisions by either sending an alarm to the operator if the dispensing equipment gets too close to the airplane or enforcing that the dispensing procedure is stopped if this happens.

Despite these assisting technologies, the operators are still required to maintain the right distance and make decisions on the go to ensure that the target surface is adequately covered by the fluid being dispensed, making the right number of passes and getting to all the needed surfaces. Even small mistakes may lead to areas of the surface being missed, excess fluid being used at the edges may lead to material waste and needlessly long paths may be taken to cover the target surfaces thoroughly leading causing the process to take longer, thereby keeping the airplane grounded longer than necessary.

It is an object of the present invention to provide a method for autonomous dispensing of fluid capable of quickly and efficiently treating surfaces of an airplane said dispensing taking place autonomously such that an operator is not needed for or need only limited involvement in steering the dispensing systems during the treatment of the airplane surface.

The above object and advantages together with numerous other objects and advantages, which will be evident from the description of the present invention, are according to a first aspect of the present invention obtained by:

A method for applying a fluid, such as deicing fluid, to a surface of an airplane, said method comprising:
  providing said airplane,
  providing a vehicle loaded with said fluid, said vehicle having a nozzle for spraying said fluid onto said surface,
  providing a sensor and a processing unit for determining a 3D representation of said surface,
  determining said 3D representation by means of said sensor and said processing unit, determining a plurality of points of said surface such that each point having a distance to said 3D representation, said plurality of points arranged such that said surface being applied with said fluid when moving said nozzle through said plurality of points,
  moving said vehicle to a position for moving said nozzle through said plurality of points, and
  moving said nozzle through said plurality of points and applying said fluid to said surface as said nozzle being moved through said plurality of points.

The plurality of points off said surface constitutes a trajectory or path that the nozzle follows as it moves along the surface (at a distance to the surface) by point from one point to the next. The path may be curved.

The points may also be used to formulate an analytical expression for the path, i.e. formulated as an equation—for example two points may be used to express a path comprising a line. The line itself comprises an infinite number of points between the ends of the line.

The 3D representation of the surface constitutes a boundary representation of the object, for example the whole airplane or the wing, i.e. the surface defines the boundary of the object (the surface separates the object interior from the environment).

The 3D representation may comprise a set of points (a point cloud), and by 3D representation is meant data that is enough to form a 3D model, i.e. the number of points is to be large enough such that it constitutes a 3D model of the surface.

The points may be connected by lines, and it may be these lines that are stored in the memory and represent the surface (the lines may constitute polygons, each polygon being a collection of lines). This is also called a mesh or line or polygon representation.

The surface is not a planar surface (a plane), i.e. the surface is curved (meaning that for the wing there is a cambered airfoil—the top surface of the wing is more convex than the bottom surface—the wing has a thickness with a maximum thickness between the leading and trailing edge and the minimum thickness at either the leading edge or trailing edge).

A plane may be defined by three non collinear points, but the point cloud is to comprise more than three non collinear points in this case since the surface is not a plane such as more than four non collinear points in three dimensions (x,y,z).

If lines are used for the 3D representation, more than two lines are to define the surface (two lines can only define a plane).

The 3D representation may be the representation of the curved surface between the leading edge of the airplane wing and the trailing edge of the airplane wing.

Determining the 3D representation of the surface which fluid is to be dispensed onto has multiple benefits. The amount of fluid needed depends on the area of the surface to be treated and the places in which fluid should be added to achieve the desired coverage of the surface can be determined based on the shape of the surface. Furthermore, determining the amount and positions of fluid application allows the minimization of fluid waste as it is possible to avoid excess use of the fluid as well as dispensing of fluid to regions away from the target surface, e.g. too close to edges where part of the material will miss the target surface.

Furthermore, based on the identified shape of the surface it is also possible to ensure the necessary distance between the nozzle and the surface as well as the arm and the surface to avoid collision between the airplane surface and the autonomous system.

Determining the path based on the determined 3D representation of the shape allows the dispensing of fluid to be performed autonomously while ensuring that fluid is being applied to the full surface. Performing the method autonomously makes it possible to increase the speed of the treatment by minimising excess movement. Furthermore, it makes it possible to perform the fluid dispensing without the need of specialised crew, thereby limiting the number of procedures only by the number of machines and not by the available personnel.

The fluid to be added to a surface of the airplane can be any fluid which can be added by distribution through a nozzle to the surface of an airplane with the purpose of treatment and/or maintenance of that surface.

The fluid may be a deicing fluid, paint, a cleaning agent, or a fire extinguishing fluid.

The optimum trajectory/path may be affected by the fluid, e.g. because of different viscosity and density of the various possible fluids. Hence the trajectory may be a function of the fluid.

For a position of the nozzle (nozzle position in xyz space), a target surface for the fluid may also be determined, i.e. the surface area that is within reach of the nozzle from that nozzle position. The target surface may be a function of the 3D representation, and the spray angle for the nozzle.

The 3D representation may be used to generate an image of the surface. This image may be displayed on a display on the vehicle. For example, in a vehicle cabin which the operator of the vehicle may be arranged in during operation of the vehicle. The operator may then view the image on the display and compare to the actual/physical surface the operator is seeing such that the operator may get an idea of whether or not or not the 3D representation is in fact a representation that is correct or if there is an error. The display may be a head up display.

The image may be generated such that when displayed on the head up display it creates an augmented reality, i.e. the image overlays the actual surface, i.e. the position of the actual surface is known and this may be used to generate the mapping of the image onto the actual surface.

In some variants when applying fluid from the nozzle to the surface the dispensing of the fluid from the nozzle may be continuous as it moves along the path. In other variants the nozzle dispenses fluid intermittently at specific locations along the trajectory.

According to a further embodiment of the first aspect of the invention, the method comprises determining the path such that the dispensing duration is minimized.

By the dispensing duration is understood the time in which fluid is dispensed from the nozzle onto the target surface. In cases where multiple surfaces are being treated, it is the full dispensing duration from the beginning of dispensing onto the first surface until the end of dispensing on the last surface which is considered in the dispensing duration even if dispensing does not take place continuously during the full treatment procedure. The path may also include the movement from one surface to another and optimising this movement contributes to shortening the time of the full treatment as well.

By minimising the dispensing duration, the time it takes to treat the airplane is kept as short as possible such that the airplane does not need to stay on the ground longer than necessary.

According to a further embodiment of the first aspect of the invention, the method comprises determining the path such that the movement of said vehicle is minimized.

Movement of the vehicle is time consuming, and thus minimizing the movement of the vehicle by keeping it stationary while the nozzle is moved by other components of the autonomous dispensing system allows for fast and precise control of the areas onto which the fluid is being dispensed. For target surfaces so large that they are not within the reach of the nozzle from a single dispensing position of the vehicle, it will be necessary to drive the vehicle during the treatment procedure. In a preferred variant the method is optimized such that the number of times the vehicle is moved is minimized. In another preferred variant, the method is optimized such that the distance the vehicle moves is minimized. It is preferable that both of these parameters are kept to a minimum.

According to a further embodiment of the first aspect of the invention, the method comprises determining the path such that the change of position of the nozzle is minimized.

The nozzle may be moved by other means than driving the vehicle, e.g. by moving an arm on which the nozzle is mounted. Minimizing the change in position of the nozzle will further contribute to minimizing the dispensing duration.

According to a further embodiment of the first aspect of the invention the method comprises a first dispensing position at which the vehicle is at least temporarily stationary during the dispensing of material.

While the vehicle is stationary the treated area of the surface may still be altered, e.g. by moving an arm on which the nozzle is mounted on the vehicle or by changing the dispensing angle and thus the angle of incidence of the fluid onto the surface.

According to a further embodiment of the first aspect of the invention, the method comprises making at least one sweep while the vehicle is stationary at a first dispensing position.

By a sweep is understood the movement of one section of the autonomous dispensing system in one direction. For example, a sweep may constitute moving an arm on which the nozzle is mounted in one direction. It is to be understood that a direction does not need to be linear, it may e.g. be movement along an arc in the case where an arm of a fixed length is moved around a joint stationary at a single point, but during a sweep the nozzle will not move back in the opposite direction.

According to a further embodiment of the first aspect of the invention, the method comprises minimizing the number of sweeps.

According to a further embodiment of the first aspect of the invention, the method comprises making no more than seven sweeps, such as no more than three sweeps.

According to a further embodiment of the first aspect of the invention, the method comprises determining the speed with which said nozzle moves along said path.

In some variants the movement speed of the nozzle may be constant. In other variants the movement speed of the nozzle may be varied. Moving faster will shorten the dispensing duration, but moving too fast will also lead to not enough fluid being dispensed onto the surface, such that the treatment is not completed. However, some areas of the target surface may require less fluid, e.g. in a de-icing process some areas may be less prone to collect thick layers of ice. In such cases, the dispensing duration may be shortened by increasing the movement speed of the nozzle in those areas and the nozzle may be slowed down again when reaching areas where more fluid is required.

According to a further embodiment of the first aspect of the invention, the method comprises determining adjustments of the dispensing angle of said nozzle relative to said surface depending on the position of said nozzle along said path.

By the dispensing angle is understood the angle of incidence of the central line of the nozzle with respect to the target surface of the airplane. By altering the dispensing angle, it is thus possible to change the area of the surface which is being treated without changing the position of the nozzle relative to the surface. In some variants it may also be possible to vary the spray angle and thereby control the size of the cone of fluid being dispensed and thereby adjust the area onto which fluid is being dispensed as well as the pressure with which the fluid contacts the surface.

According to a further embodiment of the first aspect of the invention, the method comprises determining adjustment of fluid flow depending on the position of said nozzle along said path.

Fluid flow may also be used to ensure that a sufficient amount of fluid is being dispensed onto the surface to provide the necessary treatment in the shortest amount of time.

According to a further embodiment of the first aspect of the invention, the method comprises the path being fully computed before dispensing of said fluid from said nozzle commences.

According to a further embodiment of the first aspect of the invention, the method comprises determining the 3D representation by sensing a plurality of datapoints of the surface and translating the datapoints to the same frame of reference.

When more than a single sensor is being used and/or when the sensors move relative to the airplane, the datapoints collected by the sensors will be shifted compared to each other. In such cases, translating said datapoints into the same frame of reference allows the datapoints collected at different times and different places to contribute to a more thoroughly mapped 3D representation of the surface than what would have been collected by a single sensor in that same period of time. Mapping to the same frame of reference is made possible by continuously tracking the position of the sensors relative to the airplane and relative to each other. Knowing the sensor positions may be done either by having fixed sensors or by including position monitoring means with the sensors.

According to a further embodiment of the first aspect of the invention, the method comprises creating a SLAM map of the surface of the airplane.

According to a further embodiment of the first aspect of the invention, the method comprises segmenting clusters of datapoints into segmented surfaces corresponding to parts of the airplane.

Segmenting the datapoints into clusters representing known parts of an airplane, e.g. a wing or a stabilizer of the rear section, makes it possible to verify that the 3D representation of the relevant surface has been completed without needing to create a 3D representation of the full airplane. By only performing mapping of the relevant surfaces, the process of determining the 3D representation may be sped up.

Segmenting the surfaces further allows separate mapping of paths for the different segments and between said segments. By decreasing the amount of data included in the computation of each path the processing time may be decreased.

According to a further embodiment of the first aspect of the invention, the method comprises determining the parts of the airplane the segments correspond to by computing Ensemble of Shape Functions of the surfaces and comparing the ensemble of shape functions with signature functions corresponding to airplane parts. According to a further embodiment of the first aspect of the invention, the method comprises providing a database of pre-existing 3D representations of at least one airplane model and retrieving a pre-existing 3D representation of the airplane.

By storing and retrieving pre-existing 3D representations of the model of airplane to be treated it is possible to decrease the number of datapoints that must be collected before the treatment of the surface ensues. Some datapoints are still required to determine the positioning of the airplane and orient the model surfaces with respect to the actual airplane, however, needing fewer data points makes it possible to simplify the sensor configuration as well as speeding up the process of determining the 3D representation.

According to a further embodiment of the first aspect of the invention, the pre-existing 3D representation being a CAD model.

According to a further embodiment of the first aspect of the invention, the database comprising at least one predetermined path corresponding to at least one airplane model in the database.

Paths computed before the airplane is to be treated may be stored in the database and be related to specific models. By retrieving an already computed path rather than computing a path anew it is only necessary to determine the orientation of the path with respect to the airplane onto which the fluid is to be dispensed, e.g. by determining a starting point of the path or a dispensing position where the vehicle is to park.

Determining the path by retrieving it from a database can significantly decrease the computing time compared to computing the path anew.

According to a further embodiment of the first aspect of the invention, the method comprises determining at least two datapoints corresponding to the surface and correlating the datapoints to the pre-existing 3D representation retrieved from the database, such that the relative positioning of the surface and the nozzle may be determined.

According to a further embodiment of the first aspect of the invention, the method comprises using Monte Carlo localization when determining the relative positioning of the surface and the nozzle.

According to a further embodiment of the first aspect of the invention, the method comprises receiving an airplane identification code.

By an airplane identification code is understood a means for identifying the type of airplane, e.g. its model. The identification code may for example be a string assigned to and transmitted directly from the airplane, it may be a flight number, or it may be a name painted on the airplane and received by the autonomous dispensing system by vision sensing and image recognition. In a preferred variant, the processing unit may then determine the model of the airplane based on the airplane identification code and then query the database for 3D representations of that model of airplane.

In another preferred variant, the method comprises receiving a model number corresponding to the airplane.

According to a further embodiment of the first aspect of the invention, the method comprises continuously monitoring a minimum distance from the vehicle to the airplane such that the method is ended before completion if the minimum distance becomes below a threshold value such that collision may be avoided.

Continuous monitoring of the distance provides a safeguard against collision even in the case where an error might have occurred in determining the path, e.g. if obscuring view of a sensors may have led to erroneous determination of the surface.

According to a further embodiment of the first aspect of the invention, the method where the surface to be treated is a wing.

According to a further embodiment of the first aspect of the invention, the method comprises heating the fluid before dispensing of the fluid onto the surface.

Treatment of the surfaces of the airplane may be sped up by using a heated fluid. This may for example be the case where the fluid is a de-icing fluid and heat further contributes to the melting of the ice to be removed from the surface of the airplane.

Another object of the present invention is to provide an autonomous dispensing system capable of quickly and efficiently dispensing a fluid onto surfaces of an airplane said dispensing system being operated autonomously such that an operator is not needed or need only limited involvement in steering the dispensing systems during the treatment of the airplane surface.

According to a second aspect of the present invention, the above objects and advantages are obtained by:

An autonomous dispensing system for adding a fluid, such as de-icing fluid, to a surface of an airplane, the system comprising:
- a vehicle for carrying and transporting other components of the system,
- a container for storing the fluid,
- a nozzle for dispensing the fluid from the container onto the surface, the nozzle being fluidically connected to the container,
- an arm for adjusting the position of the nozzle, the arm being connected to the nozzle by a nozzle joint,
- a boom for adjusting the position of the nozzle, the boom being connected to the arm by an arm joint and the boom being connected to the vehicle by a boom joint,
- at least one actuator for moving the nozzle joint, the arm joint and the boom joint,
- at least one sensor for detection of the surface and tracking of the position of the nozzle, at least one sensor being mounted at the nozzle joint,
- a processing unit for storing data detected by the at least one sensor and for determining application directions based on the data.

It is to be understood that some parts of the dispensing system may be located away from the vehicle, e.g. sensors on sensor posts or a database located on an external server.

By having the nozzle mounted on an arm and a boom which are in turn mounted on a vehicle allows free adjustment of the nozzle in three dimensions. By further having a nozzle joint it is possible to finetune the area of incidence of the fluid being dispensed by adjusting the dispensing angle of the nozzle.

Having at least one sensor located at the nozzle joint enables free movement of that sensor and further, the autonomous dispensing system is constructed such that the nozzle may be freely moved. Furthermore, this positioning may be used for tracking of the nozzle position relative to the surface.

According to a further embodiment of the second aspect of the invention, the autonomous dispensing system comprises a sensor at said arm joint for sensing one or more datapoints corresponding to said surface and/or sensing the configuration of said arm joint.

According to a further embodiment of the second aspect of the invention, the autonomous dispensing system comprises a sensor at said boom joint for sensing one or more datapoints corresponding to said surface and/or sensing the configuration of said boom joint.

Having sensors located at each joint of the autonomous dispensing system allows for continuous monitoring of the configuration of those joints. Such monitoring may deliver updated information which may be used to adjust and control the configuration in accordance with the instructions such as the path of movement of the nozzle.

According to a further embodiment of the second aspect of the invention, the autonomous dispensing system comprises at least one sensor on a sensor post for sensing one or more datapoints corresponding to said surface, said sensor post being mounted away from said vehicle.

By having at least one sensor located at a sensor post, the position of that sensor is fixed and can be used for providing a stable frame of reference thus simplifying the required computations when translating datapoints of multiple sensors to the same frame of reference when determining a 3D representation of the surface of the airplane.

According to a further embodiment of the second aspect of the invention, the autonomous dispensing system comprises the arm comprising at least one telescopic section for adjusting the length of the arm and adjusting the position of the nozzle.

According to a further embodiment of the second aspect of the invention, the autonomous dispensing system comprises the boom comprising at least one telescopic section for adjusting the length of the boom and adjusting the position of the nozzle.

According to a further embodiment of the second aspect of the invention, the autonomous dispensing system comprises a database for storing 3D representations of airplanes and optionally predetermined paths.

According to a further embodiment of the second aspect of the invention, the autonomous dispensing system comprises a receiver for receiving transmitted data.

In the following, example embodiments are described according to the invention, where FIG. 1 is a top-view illustration of an airplane to be treated by an autonomous dispensing system.

Figure 1:
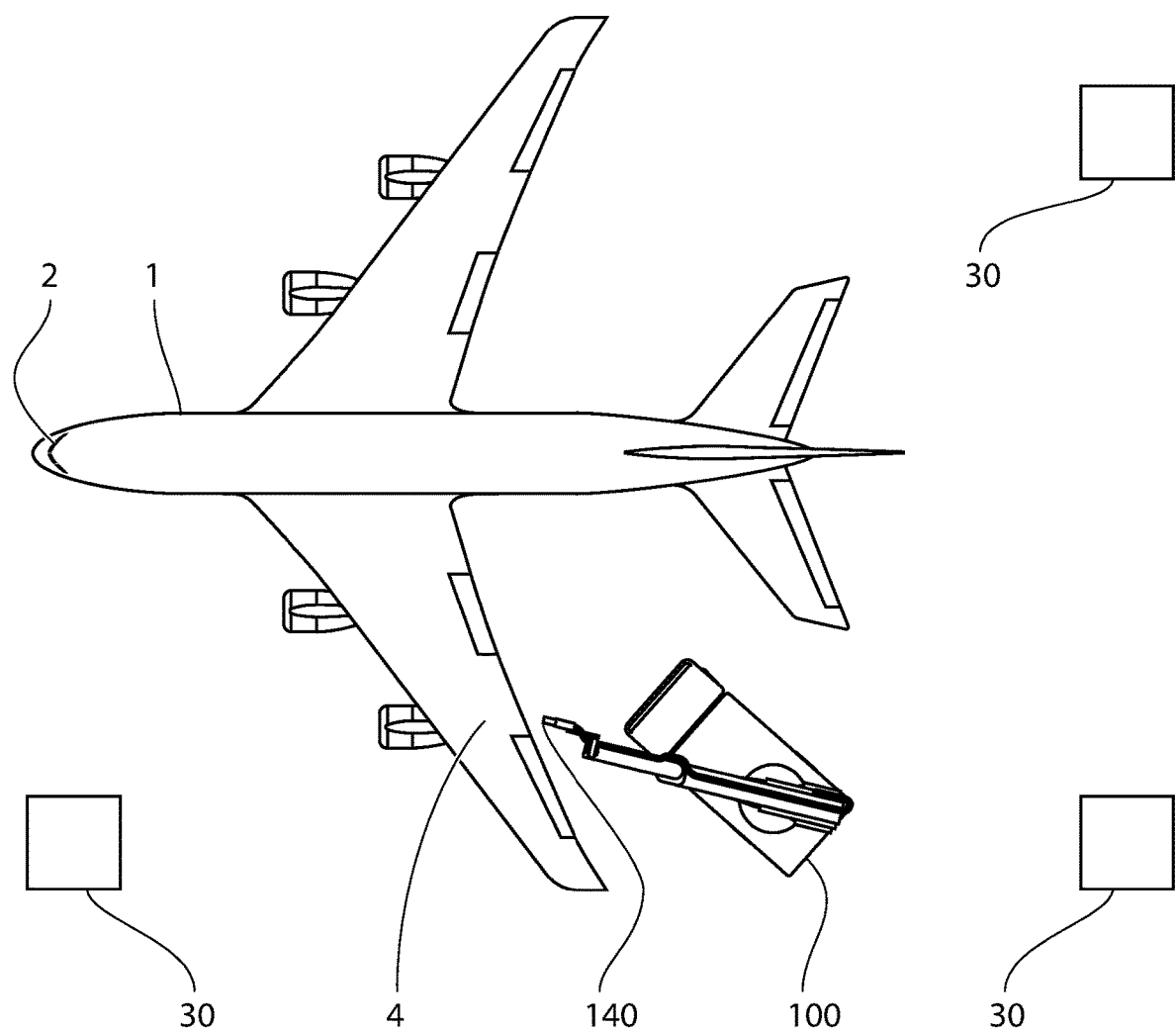

The invention will now be explained in more detail below by means of examples with reference to the accompanying drawings.

The invention may, however, be embodied in different forms than depicted below, and should not be construed as limited to any examples set forth herein. Rather, any examples are provided so that the disclosure will be thorough and complete, and will fully convey the scope of the invention to those skilled in the art. Like reference numerals refer to like elements throughout. Like elements will, thus, not be described in detail with respect to the description of each figure. A detailed description of embodiments of an autonomous dispensing system as well as a method for use of such a system will be provided.

FIG. 1 shows an airplane 1 onto the surface of which a fluid is to be dispensed.

The target surface may be any part of the airplane 1 ranging from the nose 2 to the rear section including the wings 4.

An autonomous dispensing system 100 may approach the airplane 1 to dispense a fluid to the target surface of the airplane 1 through a nozzle 140 on the autonomous dispensing system 100.

In a preferred embodiment of the invention, the fluid which is dispensed from the autonomous dispensing system 100 is a de-icing fluid. Hence, in such preferred embodiments the autonomous dispensing system 100 may be considered an autonomous de-icer. The de-icing fluid may for example be warm water. The standardization organization Society of Automotive Engineers (SAE International) publishes standards for different types of de-icing fluids.

In other embodiments the fluid dispensed by the autonomous dispensing system 100 may be any other fluid relevant for surface treatment of an airplane 1, such as but not limited to: water or soapy water for the cleaning of the airplane 1, fire-retardant for use in case of an emergency or solvents that could be used for removing paint and preparing the airplane for repainting.

The autonomous dispensing system 100 includes a vehicle 110 or another means of movement such that it may move relative to the airplane 1. Thereby it is possible for the autonomous dispensing system 100 to dispense fluid to any surface of the airplane 1 by moving such that sections of the target surface is within range of the nozzle 140 of the autonomous dispensing system 100.

The vehicle 110 such as a truck or other means of movement also enables the autonomous dispensing system 100 to be used in different areas and for different airplanes.

Once an airplane 1 is located in a treatment zone, e.g. by being taxied there or where it landed, the autonomous dispensing system 100 may approach the airplane 1 to get at least part of a surface treated with a fluid dispensed from the autonomous dispensing system.

Once the dispensing procedure is ended, the autonomous dispensing system 100 may move away again before the airplane 1 leaves the treatment zone.

In some variants, a safe zone may be designated at the edge of the treatment zone, the safe zone being a region that the airplane 1 may not enter. The autonomous dispensing system 100 may be located in the safe zone while the airplane 1 arrives in the treatment zone such that there is no risk of collision in the treatment zone. Parts of the autonomous dispensing system, e.g. the parts mounted on the vehicle 110, may then exit the safe zone and enter the treatment zone once the airplane 1 is stationary and may return to the safe zone before the airplane 1 leaves the treatment zone.

The autonomous dispensing system 100 may move to a different airplane 1 in another treatment zone or it may wait in or near the same treatment zone for the arrival of another airplane or it may move away to a storage area.

Some treatment zones may comprise sensor posts 30 at fixed positions of the treatment zone. The sensor posts 30 comprises sensors statically located in the treatment zone. As the sensors of the sensor posts 30 are static, their position is known and the positions and orientation of the plane 1 and/or the automated dispensing system 100 may be determined by the sensors. Information about the position is communicated from the sensor posts 30 to the automated dispensing system 100 as part of the input used for the determination of the dispensing parameters such as the path the nozzle 140 will follow.

In one variant, sensor posts 30 may be separate structures for holding the sensors. In another variant, the sensors posts 30 may be static structures with multiple purposes, to which sensors have been attached, such structures may for example be light poles or on nearby buildings.

In other variants of the system, sensor posts 30 will not be necessary as the autonomous dispensing system 100 has the necessary sensors 150 (see FIG. 2) for determining the position of the airplane 1 integrated. In such variants, the treatment zone may have no sensor posts 30 or they may include sensor posts 30 that are idle while such autonomous dispensing systems are in use in that treatment zone.

In yet other variants, the sensors of sensor posts 30 may work in combination with sensors mounted on the vehicle 110 of the autonomous dispensing system 100.

In further variants, additional sensors may be on mobile systems separate from the vehicle 110, e.g. on drones or on other vehicles in the area.

To ensure that the positioning of the sensors is always known, they may be tracked by means of tracking such as inertial measurement units (IMU) or Global Navigation Satellite Systems (GNSS).

Regardless of the placement of the sensors, the sensors may rely on any relevant technology capable of locating objects and generating points relating to the surfaces of those objects. Such sensor technology may be, but is not limited to, LiDAR, Time of Flight, Radar, ultrasound, vision and/or stereo vision. In preferred embodiments a plurality of sensors will be present. All sensors of a specific autonomous dispensing system 100 may be based on the same sensing technology. Alternatively, the individual sensors of the plurality of sensors may be based on different technologies that may supplement each other.

Figure 2:
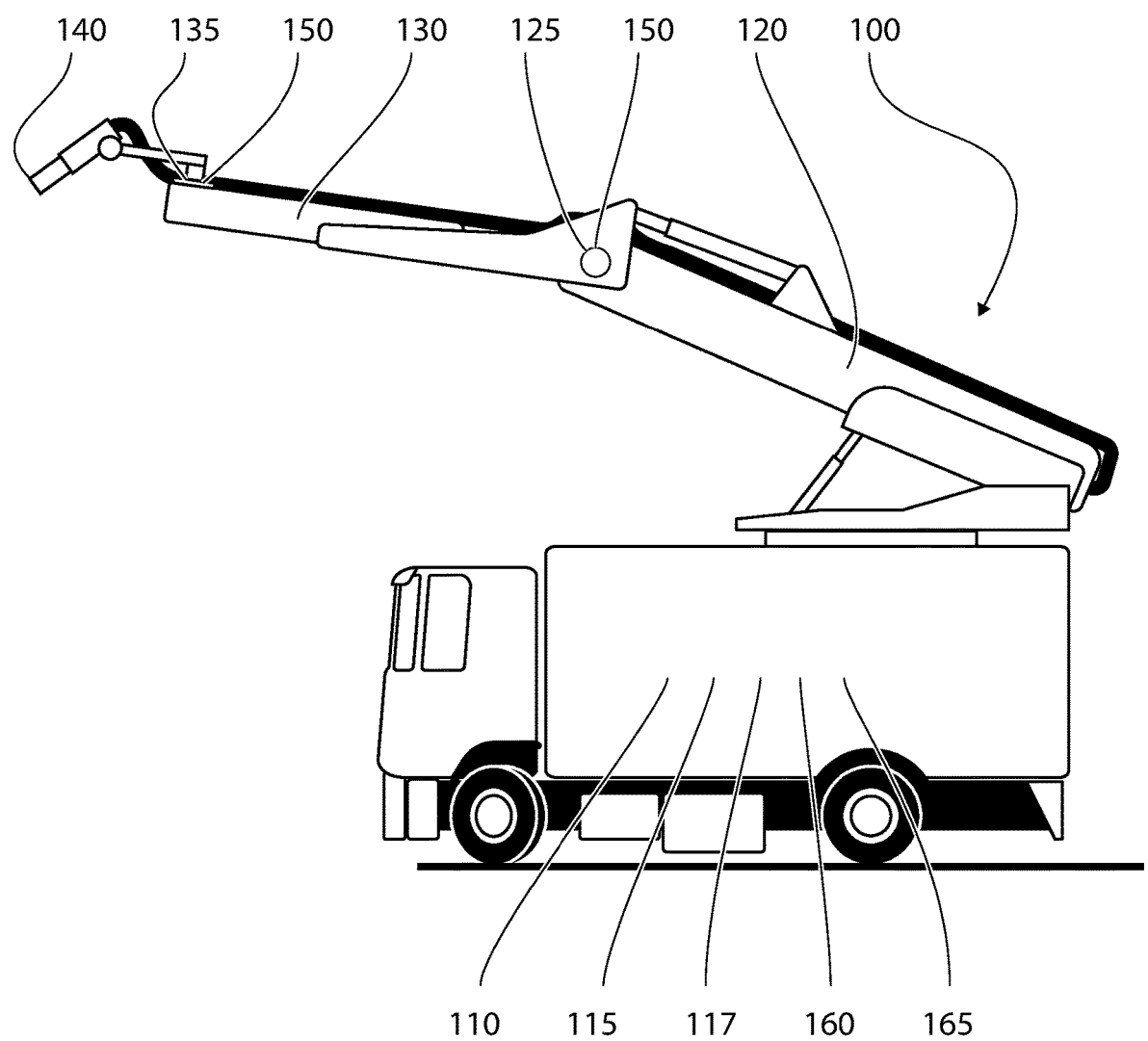
FIG. 2 is a schematic illustration of an autonomous dispensing system.

FIG. 2 is an illustration of the components of a preferred embodiment of an autonomous dispensing system 100.

The autonomous dispensing system 100 incudes a vehicle 110. By a vehicle 110 is understood any base that allows the autonomous dispensing system 100 to move. In a preferred embodiment the vehicle 110 has a built-in motor enabling the propulsion of the autonomous dispensing system 100. In a preferred variant of the system the route the vehicle 110 follows is pre-programmed or remote-controlled. In other preferred variants the vehicle 110 is manually driven by an operator from onboard the vehicle itself.

While the operator needs to position the vehicle 110, the remainder of the dispensing procedure may be performed autonomously by the autonomous dispensing system 100, thereby decreasing the amount of training required for the operator. In a preferred variant of the system, manual control overrides pre-programmed routes.

In other variants of the system, the vehicle 110 may be steered by an operator using remote control, such that the operator does not need to be on board the vehicle 110. In such cases the operator may for example be able to control the vehicle 110 from a vantagepoint wherefrom the operator may better ensure the correct positioning of the vehicle 110. Furthermore, remote-control of the vehicles may allow the same operator to control multiple autonomous dispensing systems 100 without needing to move, which is beneficial because it allows for fewer operators to be involved in the treatment of an airplane 1 and because moving between vehicles 110 in the treatment zone may be hazardous.

In yet other variants, the system is fully autonomous such that the vehicle 110 drives into position without the involvement of an operator-instead sensors may be used to determine the position of the vehicle 110 and its placement with respect to the airplane 1.

In an alternative embodiment, the vehicle 110 may be a cart or similar system pushed or otherwise moved by an external mechanism, such as an external vehicle or a moving surface on which the vehicle 110 is placed.

The autonomous dispensing system 100 comprises a nozzle 140 for dispensing a fluid to a surface of an airplane 1. The nozzle is fluidically connected to a container for holding the fluid to be dispensed. In some variants of the autonomous dispensing system 100, the container may be heated to ensure an elevated temperature of the fluid, or the fluid may be heated in the piping leading to the nozzle. Heating the fluid may be beneficial for treatments of the airplane surface where the treatment is sped up by elevated temperatures. This may for example be in systems where the fluid is a de-icing fluid and heat also contributes to the melting of ice.

The autonomous dispensing system further comprises a boom 120 and an arm 130. The boom 120 is connected to the vehicle 110 at a first end at a boom joint 115.

At the second end (opposite the first end), the boom 120 is joined to the arm 130 at an arm joint 125.

The nozzle 140 may be arranged at the distal end of the arm—the distal end being opposite the arm joint.

The boom, arm and nozzle may be connected to actuators that can be controlled by the autonomous dispensing system 100. The actuators thus enable the movement and adjustment of the position of the nozzle 140 through the movement of respectively the nozzle 140, the boom 120 and the arm 130. The actuators could for example be hydraulic and/or electric but other types of actuators may also be used.

The boom joint 115 and connected actuator allow the boom 120 to move up and down in a vertical direction with respect to the treatment zone or other support on which the vehicle 110 is situated.

The arm joint 125 and connected actuator allow the arm 130 to move back and forth in a horizontal manner with respect to the treatment zone or other support on which the vehicle 110 is situated. That is the movement of the arm 130 is substantially parallel to the treatment zone or other support on which the vehicle 110 is situated and thus substantially perpendicular to the movement of the boom 120. Thereby the movement of the boom 120 and the arm 130 allows the nozzle to be positioned in two dimensions.

The arm 130 may be a telescopic construction enabling adjustment of the length of the arm 130 thereby making positioning of the nozzle controllable in three dimensions. In some variants the boom 120 is telescopic enabling adjustment of the length of the boom 120. Embodiments where both the boom 120 and the arm 130 are telescopic are envisioned within the scope of the present disclosure as are embodiments where only either the boom 120 or the arm 130 is telescopic.

The nozzle 140 is mounted at the end of the arm 130 by means of a nozzle joint 135. The nozzle joint 135 allows angular adjustment of the nozzle, thereby making it possible to adjust the dispensing angle, i.e. the angle of incidence of the central beam of dispensed fluid and the surface on which the fluid is deposited. In a preferred embodiment, the nozzle joint 135 has at least a half-spherical free range of motion or within an angle of substantially 145 degrees or 90 degrees or 45 degrees or 35 degrees or 25 degrees.

While the nozzle 140 may be positioned in up to three dimensions through movement of the boom 120 and the arm 130, the nozzle joint 135 allows for more rapid adjustment of which region of the surface of the airplane 1 onto which the fluid is being dispensed. Thus, the angular adjustment of the nozzle 140 via the nozzle joint 135 allows more rapid coverage of the full target surface. As the mass of the structure moved by the nozzle joint 135, i.e. the nozzle 140 itself, is smaller than the mass which must be moved when adjusting the position by means of the boom joint 115 and/or arm joint 125, such adjustments of the nozzle joint 135 may be made more swiftly and requiring less energy.

The autonomous dispensing system 100 comprises a plurality of sensors 150. In a preferred embodiment the autonomous dispensing system has at least one sensor 150 mounted at the nozzle joint 135. In a preferred embodiment the autonomous dispensing system 100 has sensors 150 mounted at all of the joints, i.e. the nozzle joint 135, the arm joint 125 and the boom joint 115. By mounted at the joint is understood that it can be mounted adjacent to the joints on either side, i.e. on the arm 130, boom 120 or on the nozzle itself 140, alternatively it may be mounted on the side of the components of the joints themselves perpendicular to the moving direction of the respective joints such that the sensors 150 are not being damaged by the movement of the joints.

The plurality of sensors 150 may be used for detection of at least parts of surfaces of the airplane 1 as well as to detect the configuration and/or positioning of the part of the autonomous dispensing system 100 on which the sensor 150 is located. Different types of sensors 150 may be used in combination in the autonomous dispensing system 100, e.g. one type of sensor may be used for detecting points on the surface while others may be used to determine the location of the nozzle 140 and yet others may be used for determining the angling of the joints 115, 125, 135. The sensors may be used to detect datapoints of a point cloud mapping out parts of the airplane 1 used to determine a 3D representation of surfaces of the airplane. The sensors may map out the full airplane 1, the target surface or another partial region of the airplane which contains characterising parts of the airplane.

In addition to the sensor types previously mentioned, the sensors 150 located on the vehicle 110 of the autonomous dispensing system 100 may be position sensors, inclinometers, IMU and angle sensors, suitable for sensing the state of the joints 115, 125, 135.

In a preferred embodiment, the plurality of sensors 150 of the autonomous dispensing system 100 further comprises one or more collision sensors, for monitoring the distance of the vehicle 110 and mounted components of the autonomous dispensing system 100 to the closest part of the airplane 1. By continuously monitoring said distance it is possible to ensure that a minimum threshold is not exceeded and thus to avoid collisions that may damage the airplane and/or autonomous dispensing system 100. This may be one of the previously mentioned sensors 150 functioning as a collision sensor or it may be a separate collision sensor used solely for that purpose. In a preferred embodiment the autonomous dispensing system 100 comprises one or more sensors based on radar technology used for monitoring distance and ensuring collision avoidance.

The autonomous dispensing system 100 further has a processing unit 160. The processing unit 160 receives data from the sensors 150. The processing unit 160 further determines the path along which the nozzle 140 is to move. The processing unit 160 may determine additional parameters of the dispensing procedure such as the speed of movement of the nozzle 140, the dispensing angle, and/or the amount of fluid to be dispensed. These parameters may further vary depending on the position of the nozzle 140 along the path.

In a preferred embodiment, the processing unit 160 is onboard the vehicle 110 of the autonomous dispensing system 100. In other embodiments the processing unit 160 may, however, be located externally from the vehicle, i.e. in a control room or on a server.

In some embodiments, the autonomous dispensing system comprises a database 165. The database 165 comprises pre-existing data related to specific airplane models. The pre-existing data may include but is not limited to full or partial 3D models of the surfaces of various airplane models and previously determined dispensing paths suitable for those airplane models.

In a preferred embodiment the processing unit 160 will save determined 3D representations and the corresponding computed path along with other dispensing parameters to the database 165 in those cases where a new path has been computed.

This expands the database 165 allowing the determined path to be used in future situations where a similar surface is to be treated.

In some variants, the database 165 is onboard the vehicle 110, such that quick access is ensured and there is no risk of the processing unit 160 losing connection with the database 165. In other variants, the database 165 is stored remotely, e.g. in the cloud or in a server; in such variants it is possible that the same database 165 may be accessed by different autonomous dispensing systems 100, thereby requiring only one database 165 to be kept up-to-date to ensure that all autonomous dispensing systems 100 with access use the most recent information.

The autonomous dispensing system 100 may further comprise receivers 155 (not shown) for receiving external signals from other systems. The receivers 155 (not shown) may for example receive signals transmitted from the airplane 1, e.g. an identification code from the airplane 1 making it possible to determine the type of airplane and/or GPS signals for determining the location of the airplane 1.

Figure 3A:
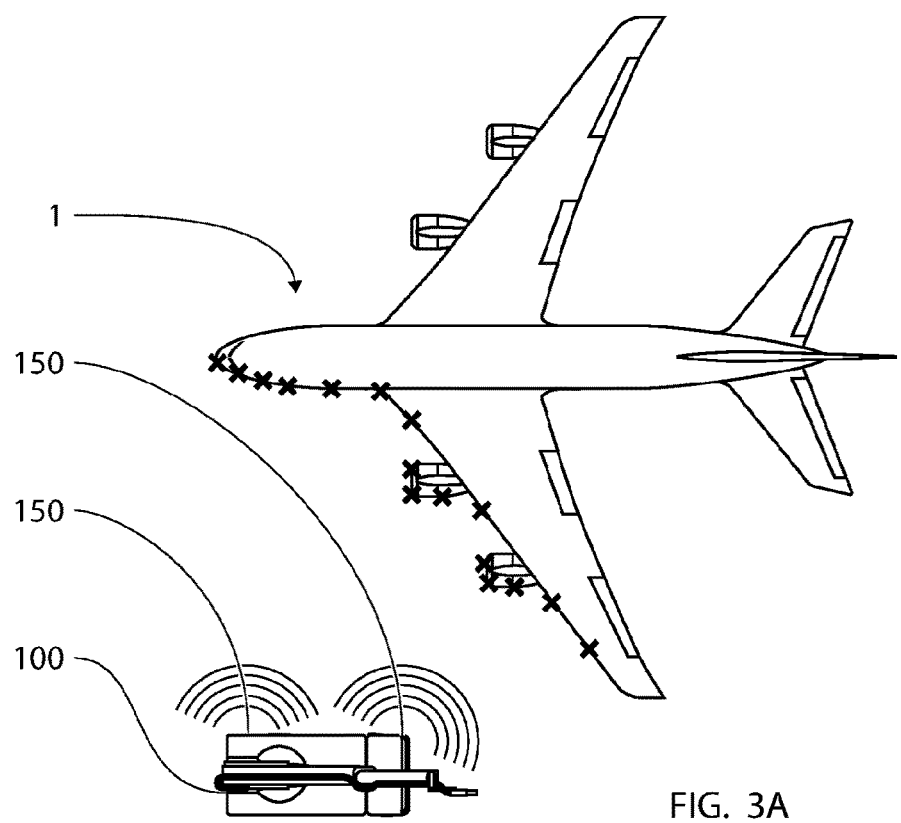
FIGS. 3a-3b is an illustration of steps in the sensing part of a method of dispensing fluid onto an airplane.
Figure 3B:
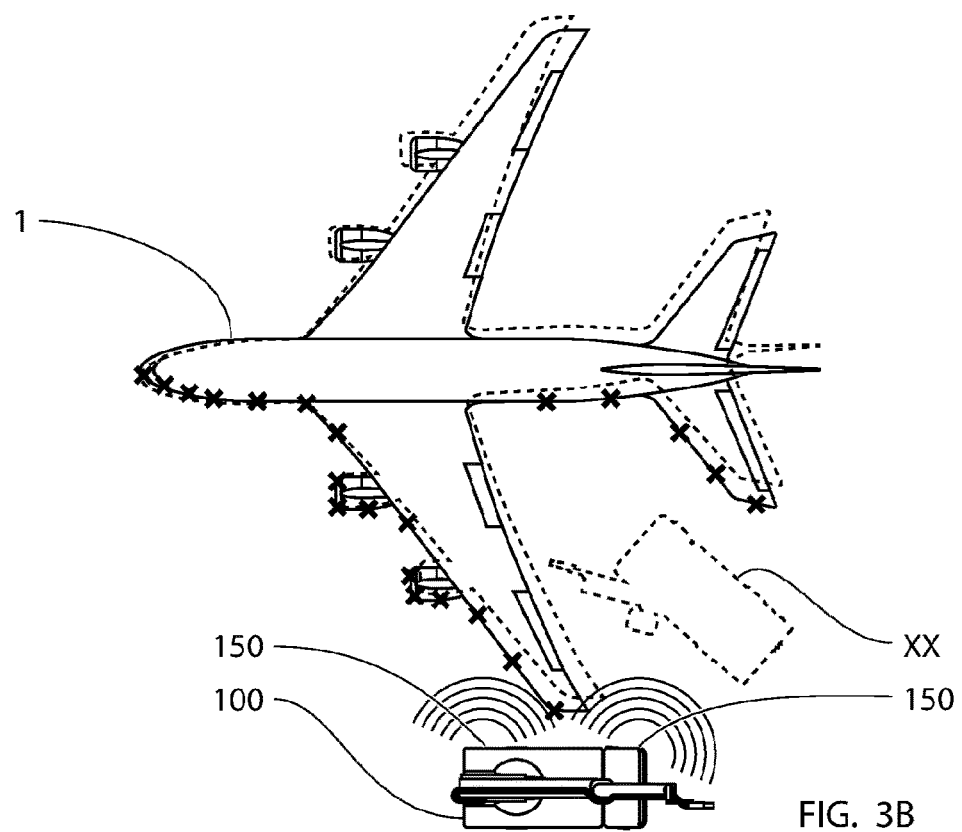

FIGS. 3*a*-3*b* illustrate steps in the process of determining a 3D representation of the surface of the airplane 1 on which a fluid is to be dispensed.

In a preferred embodiment, at least some of the plurality of sensors 150 of the autonomous dispensing system 100 will sense part of the airplane surface. The sensors 150 may be located onboard the vehicle 110 and/or on static sensor posts 30 and/or on mobile sensors. Depending on the relative position of the airplane 1 with respect to the sensors 150, the sensors may be in range of only parts of the surface of the airplane 1 as illustrated in FIG. 3*a* as the bulk of the airplane blocks the range of the sensors 150 with respect to other parts of the surface of the airplane.

Based on the surfaces of the airplane 1 initially detected by the sensors 150 of the autonomous dispensing system 100, a first estimate of the positioning of the airplane 1 may be made. Based on this first estimate of the positioning of the airplane 1, the vehicle 110 may begin driving towards an estimated first dispensing position 21. During this movement of the vehicle 110, the relative position of the airplane 1 and sensors 150 on board of the vehicle 110 will change and thus the sensors 150 will be capable of detecting other parts of the surface of the airplane 1. Based on this expanded dataset sensed by the onboard sensors 150, the estimate of the positioning of the airplane 1 and first dispensing position 1 is updated as shown in FIG. 3*b*.

In a preferred embodiment, detection of surfaces of the airplane 1 takes place while the airplane 1 is stationery. The autonomous dispensing system 100 may perform sensing both while stationary and during movement of at least parts of the autonomous dispensing system 100. It can be either the vehicle 110 and the components mounted on it which is in movement or a smaller part of the autonomous dispensing system 100 which moves during detection.

In one variant the vehicle 110 may drive to a first dispensing position 21 and sensing may then take place while the nozzle is being moved to a first endpoint of the path which it is to follow during the dispensing procedure. In a preferred embodiment, the first dispensing position 21 and the first endpoint are determined or estimated based on the initial sensing having taken place prior to the vehicle 110 driving. In another preferred embodiment, the first dispensing position 21 is predefined based on the intended position of the airplane 1 within the treatment zone; variations in the airplane position may in such variants be compensated for once the sensing is completed. Similarly, in some variants the first endpoint of the path may be predefined based on average wing sizes of the airplanes typically treated in the specific treatment zone and variations may be compensated for when the path is being determined based on the 3D representation determined by the sensors 150.

In a preferred embodiment a 3D point cloud is obtained by the plurality of sensors 150 which may be of the various types mentioned and may be located in the various positions mentioned. Correlating the positioning of the sensors to the collected datapoints of the 3D point cloud, the datapoints of the 3D point cloud are translated to a common reference frame. By translating the datapoints of the 3D point cloud to a common reference frame, a simultaneous localisation and mapping (SLAM) map is generated of the surfaces of the airplane which have been detected.

In a preferred variant the datapoints of the point cloud are segmented such that points related to the same surface may be clustered together. For example, the target surfaces may be the wings 4 of the airplane 1 as well as the stabilisers of the rear section, which may in turn be divided into segments relating to each stabiliser. By segmenting the relevant surfaces, said surfaces may be stored separately in the database 165 and paths may be optimised for each part separately as may the paths for moving from one cluster to another. In embodiments where the surface segments are compared to previously determined surfaces of the database 165, the comparison may be sped up by comparing only the relevant segments relating to the target surfaces.

In a preferred embodiment, the process of identifying parts of the airplane 1 and thus the target surfaces comprises comparing signature functions of the segmented point cloud. The signature functions may be used to identify what type of surface the segmented point cloud is, e.g. a wing, the nose 2 of the airplane 1, a stabiliser of the rear section or a specific part of the fuselage. In a preferred variant, the signature function is based on Ensemble of Shape Functions (ESF) such that the 3D information of the segmented point cloud is mapped to one or more histograms. The processing unit 160 contains signature functions of different airplane parts, thus by comparing database signature functions with the signature functions of the determined 3D representation of the surface it is possible to determine which part of the airplane 1 it corresponds to.

In a preferred embodiment the autonomous dispensing system 1 comprises a database 165 of signature functions related to different airplane models. In such cases the model of the airplane 1 onto which the fluid is to be dispensed may be determined from the comparison of the signature function calculated from the determined 3D representation of the sensed surfaces.

In other embodiments the signature function of the determined 3D representation of the sensed surface is compared with a higher tolerance to standard signature function for the types of parts of the airplane, e.g. wing, stabiliser, fuselage, etc. to categorise the segment of the 3D point cloud while not identifying the model of the airplane. This is possible even when there is a significant difference between the standard signature function and the signature function of the determined 3D representation, as may happen due to variation in the builds of airplane models, since the deviation will still be significantly larger when comparing different parts of the airplane, e.g. comparing a wing to a nose, than when comparing wings of different models.

In some preferred embodiments, the autonomous dispensing system 100 may receive an airplane identification code, identifying the model of the airplane. In one variant the airplane identification code may be transmitted by the airplane itself. In another variant, the airplane identification code may be determined by a visual sensor and image recognition tools determining identification on the surface of the airplane, e.g. number or name written on the airplane. In yet another variant, the airplane identification code may be correlated to the treatment zone, e.g. if only one type of airplane is treated in the specific treatment zone or an identifier being placed at the treatment zone and transmitting to the autonomous dispensing system 100. In such embodiments, the processing unit 160 may then query the database 165 if 3D representations of such airplane models are available. Pre-existing 3D representations stored in the database 165 may be data stored from previous 3D mapping made either by an autonomous dispensing system 100 or by another system made for mapping 3D representations of surfaces and/or the pre-existing 3D representations may be Computer-Aided Design (CAD) models of the airplane 1. If a 3D representation is available, the processing unit 160 may further query whether a precalculated path and possibly other dispensing parameters are available for said airplane model.

In the case where a 3D representation, and possibly also a path, is already available it is still necessary to use the sensors 150 of the autonomous dispensing system 100 to determine the positioning of the airplane 1, i.e. placement and orientation of the airplane 1. At least two points on the airplane 1 must be sensed, such that it is possible to align the 3D representation retrieved from the database 165 with the actual orientation of the airplane 1 to be treated. Each sensed datapoint is compared against the corresponding 3D representation retrieved from the database 165 to find the relative positioning of the airplane 1 with respect to the sensors 150. In a preferred embodiment the processing unit 160 uses adaptive Monte Carlo localisation to determine the relative positioning of the airplane 1 with respect to the sensors 150. As the position of the other components of the autonomous dispensing system 100, e.g. the vehicle and the nozzle 140, are known with respect to the sensors 150, the distance between the nozzle 140 and the airplane 1 is determined based on the retrieved 3D representation and the sensed datapoints. Once the relative positioning of the airplane has been determined, a path may either be calculated by the processing unit 160 or retrieved from the database 165. In the case where the path is retrieved, the processing unit 160 will then translate the path to the reference frame determined for the airplane 1.

In some variants the autonomous dispensing system 100 may receive GPS data indicating the position of the airplane. Sensing may still be necessary to determine the pose or orientation of the airplane 1.

In situations where no 3D representation of the airplane model is available to the processing unit 160, a 3D representation is determined from datapoints collected from the sensors 150. The path is determined based on said 3D representation of the surface. The 3D representation contributes information on the area to be treated and the contour of the surface thus providing boundary conditions for the path.

In a preferred variant, the leading edge of the wing 4 will be identified, when the wing 4 comprises the target surface. Edge points along the leading edge are then calculated, these edge points are used for determining the path, e.g. these datapoints of the surface may be used as the boundary conditions for the determination of the path. The leading edge is of particular interest as it defines a boundary of the wing 4. In a preferred variant, segments of the path will be parallel to the points calculated along the leading edge.

Figure 4:
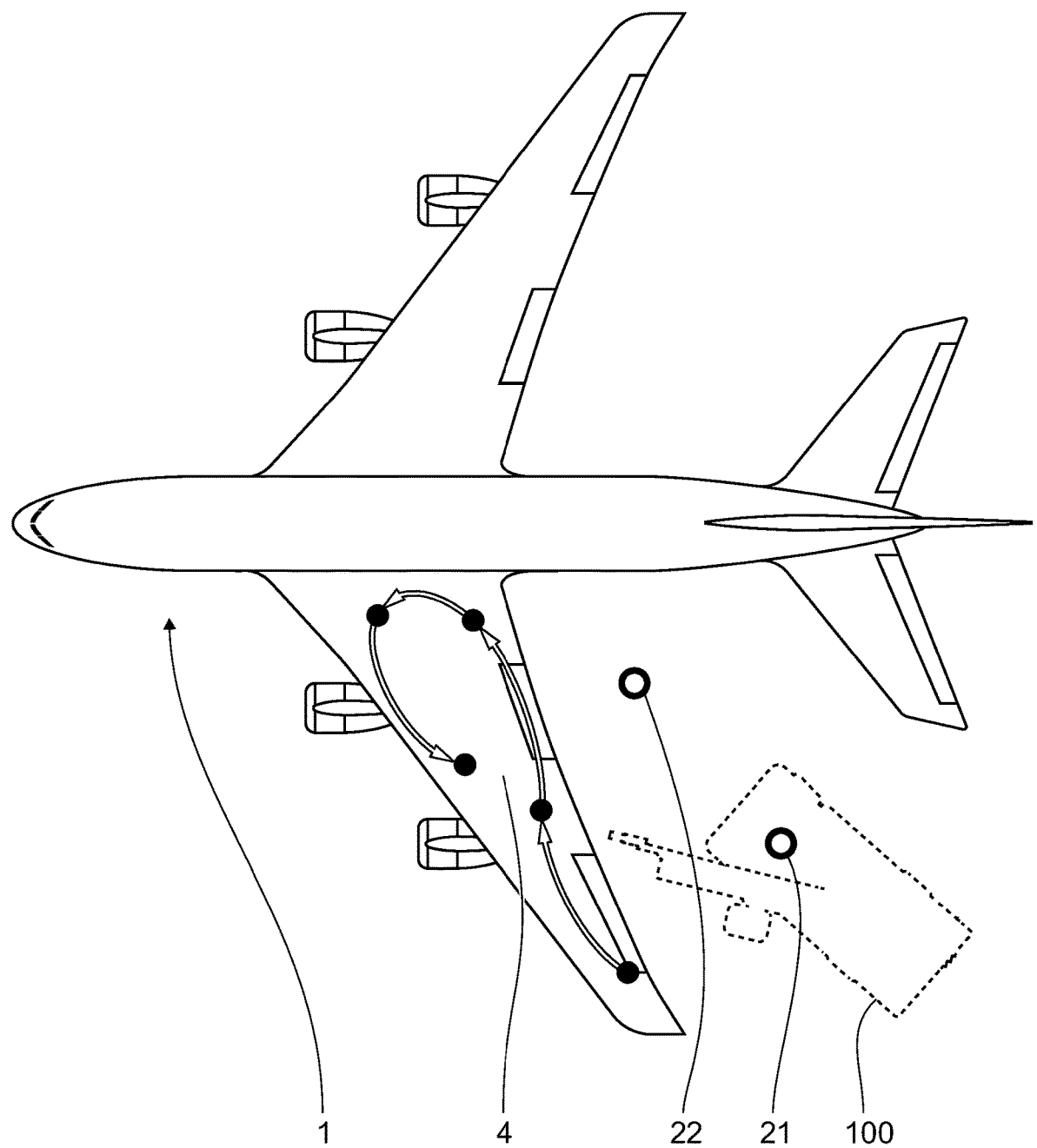
FIG. 4 is an illustration of steps in a method of dispensing fluid onto an airplane while following a determined path for dispensing.

FIG. 4 illustrates a potential dispensing path which the nozzle 140 follows as it dispenses fluid onto a target surface, shown for the case where the target surface is the wing 4 of an airplane 1.

In a preferred embodiment, the path is optimised such that fluid is dispensed to the entirety of the target surface while the dispensing duration is minimised.

By the dispensing duration is understood the time in which fluid is dispensed from the nozzle 140 onto the target surface, for example the time it takes to deice the wing of the airplane.

In a preferred embodiment, the dispensing duration is minimised by minimising the movement of the vehicle 110 during fluid dispensing. The required movement of the vehicle 110 depends on the area of the target surface and the reach of the autonomous dispensing system 100, e.g. the length of the arm 130 and the boom 120. For some target surfaces, the vehicle 110 may be driven to a first dispensing position 21 from where the entire target surface may be treated by using of the actuators to steer the joints 115, 125, 135 and/or the telescopic elements of the arm 130 and/or boom 120 while the vehicle 110 remains stationary at the first dispensing position 21 for the entirety of the dispensing duration.

For other target surfaces, the vehicle may drive to a first dispensing position 21 from where one or more sweeps are performed before the vehicle 110 drives to a second dispensing position 22 where one or more sweeps are performed. It is to be understood that more than two dispensing positions may be necessary depending on the area and shape of the target surface as well as the reach of the autonomous dispensing system 100.

In some variants, the nozzle 140 will dispense fluid onto the target surface while the vehicle drives from the first dispensing position 21 to the second dispensing position 22. In other variants, fluid dispensing will be paused while the vehicle 110 drives from the first dispensing position 21 to the second dispensing position 22. Regardless of whether fluid is being dispensed, the arm 130 may move while the vehicle 110 is driving to enable the nozzle 140 to be in an optimum position for sweeping once the vehicle 110 arrives at the second dispensing position 22.

In another preferred embodiment, the dispensing duration is minimised by continuously moving the vehicle 110 along the target surface while fluid is being dispensed onto the target surface 50. However, keeping the vehicle parked during dispensing may decrease the risk of collision between the airplane and the vehicle.

By a sweep is understood the movement of one section of the autonomous dispensing system 100 in one direction. For example, a sweep may constitute activating the actuator of the arm joint 125 to enable the movement of the arm 130 along the target surface. The path which the nozzle 140 follows during such a sweep may be curved or may be linear, but the joint activated for the sweep will move in only one direction. Multiple sweeps may be performed along the path.

In one example, a first sweep may be performed by moving the arm 130 in one direction, subsequently a second sweep may be made moving the arm 130 back in the opposite direction. Multiple passes of sweeps along the same section of the target surface may be beneficial in the situation where more efficient treatment is achieved by dispensing fluid onto the target surface with a delay, e.g. if a layer to be removed from the target surface is so thick that an addition of additional fluid is necessary to remove the full layer, such a layer might for example be ice or dirt.

In FIG. 4 the beginning and the end of a sweep is marked with a solid circle, and the sweep is illustrated with an arrow beginning at a solid circle and ending at a solid circle.

In another example a first sweep may be made by moving the arm 130 in one direction by activating the actuator of the arm joint 125, subsequently a second sweep is made by activating the telescopic movement of the arm 130 whereafter a third sweep is made by activating the arm joint 125 to move the arm 130 in the opposite direction of the first sweep. Such movement may be beneficial in the case, where the target surface has an area larger than what can be covered by a single sweep. In such cases the length of the second sweep will be determined such that the full target surface will receive dispensed fluid.

In a preferred embodiment, the nozzle joint 125 may be moved to adjust the dispensing angle during a sweep. By controlling the nozzle joint 135 and steering the sweep angle, fluid may be dispensed onto a larger surface than would otherwise be within range of the nozzle 140 form a given nozzle position. In a preferred operation case, the adjustment of the dispensing angle happens more rapidly than the adjustment of the position of the nozzle 140 during the sweep thereby increasing the area of the target surface onto which fluid is dispensed during a single sweep.

In a preferred variant, the nozzle joint 135 is activated such that the nozzle 140 is rotated in a circular manner during a sweep. In another preferred variant, the nozzle joint 135 is activated such that the centre of the covered area moves perpendicular to the path of the sweep.

In a preferred embodiment, the dispensing duration is minimised by optimising the path to comprise the least possible number of sweeps. In a more preferred embodiment, the path comprises no more than seven sweeps when the target surface is a wing 4 of an airplane 1. In an even more preferred embodiment, the path comprises no more than three sweeps when the target surface is a wing 4 of an airplane 1. In a yet more preferrable embodiment, the path comprises no more than three sweeps per dispensing position 21, 22.

Other dispensing parameters than the path may include, but are not limited to, the movement speed of the nozzle 140, the dispensing angle, the fluid pressure, and the fluid flow rate. In some variants, one or more of these additional dispensing parameters are fixed, e.g. the fluid flow rate remains constant throughout the duration of the treatment of the surface and/or the speed of movement of the nozzle 140 may remain constant throughout the duration of the treatment while the remaining parameters are varied to optimise the speed of treatment of the surface, i.e. to minimise the dispensing duration of the treatment.

In other variants, all dispensing parameters may be adjusted to optimise the speed of the treatment and/or minimisation of fluid used for the treatment of the surface. For example, the amount of and/or pressure with which the fluid is dispensed may vary to increase the area which can be treated from a given position of the nozzle 140. In another example, the fluid flow may be decreased while the nozzle 140 is traversing a part of the surface which has a smaller area than a neighbouring part. As the smaller area may need less fluid for sufficient treatment, fluid waste may be avoided by decreasing the amount of fluid dispensed. In other cases, the parameters may be optimised such that the movement speed is increased when a part of the surface with a smaller area is traversed; the faster movement will in turn lead to less fluid being dispensed onto that part of the surface while simultaneously shortening the duration of the treatment.

Autonomous dispensing systems 100 operating with fixed dispensing parameters and which query a database 165 for pre-existing dispensing parameters may limit the query to parameters which they are capable of adjusting and/or to specific set values of those dispensing parameters being identical to the fixed parameters of the specific autonomous dispensing system 100.

While FIG. 4 shows the surface to be treated as being the wing 4, it is to be understood that the target surface may include anywhere along the fuselage and/or be both wings and/or the rear section if the airplane 1. In cases where the same autonomous system 100 is to treat multiple parts of the airplane 1, the path includes movement between the surfaces on which the fluid is to be dispensed. For example, there may be a first dispensing position located adjacent to one wing 4, a second dispensing position adjacent to one side of the rear section, a third dispensing position adjacent to the opposite side of the rear section, and a fourth dispensing position adjacent to the other wing.

In a preferred embodiment, the method comprises performing 3D mapping of target surfaces of the airplane. By correlating the sensed datapoints on the surface with the known positions of the sensors, the sensed datapoints of the 3D point cloud are then translated to a common frame of reference to create a 3D representation of the target surfaces. In a preferred variant, the 3D representation of the surfaces is a SLAM map. Clusters of sensed datapoints may be segmented into segments relating to specific parts of the airplane 1.

Identifying the parts of the airplane, e.g. a wing 4 or the nose 2, may be done by means of signature functions and comparing the sensed data to a predefined set of signature functions corresponding to the relevant parts of an airplane.

Once the 3D representation of the surface is determined, relevant points for the dispensing path may be determined. Relevant points may, e.g. be points along the edge of the surface, such as the leading edge of a wing 4 or contours of the stabilisers of the rear section, other relevant points may for example be the highest and lowest point, such that the boundaries of the area is found and may be used as boundary conditions for the determination of the path.

Based on those extracted planning points, the path is determined by the processing unit 160. The path is to be understood as the path through those points (the path that comprises those points).

The path may be generated separately for each of the segmented surfaces in which case paths between each surface will also be determined such that they can be combined into a full path for the entire dispensing treatment of all target surfaces.

Once the path is generated, the dispensing process is executed. The nozzle 140 is moved along the path while fluid is dispensed onto the target surfaces. The movement of the nozzle 140 being done by a combination of movement of the boom 120, the arm 130 and the vehicle 110, for example sweeping the arm while the vehicle and boom are held still.

During the movement of the nozzle 140, sensors continuously monitor the distance between the part of the autonomous dispensing system 100 mounted on the vehicle 110 and the airplane 1. The distance is monitored to minimise the risk of collisions, as the system may be stopped if the sensed distance becomes less than a threshold value.

In another preferred embodiment, the method comprises mapping datapoints and comparing those datapoint to pre-existing 3D representations in a database 165. The database 165 comprising a plurality of 3D representations of airplanes of various models.

The pre-existing 3D representations in the database 165 may either be constructions from scans previously made of airplanes previously treated and/or they may be CAD models of airplanes-a pre-existing dataset corresponding to the model of airplane 1 which the autonomous dispensing system 100 is intended to dispense a fluid onto.

The collected datapoints sensed on the surface of the airplane 1 are correlated to the corresponding 3D representation retrieved from the database 165 such that the relative positioning of the autonomous dispensing system 100 and the airplane 1 may be determined.

In a preferred embodiment, the relative position of the 3D mapping sensor and the airplane 1 is determined using adaptive Monte Carlo localisation. The positioning of the plurality of sensors 150 of the autonomous dispensing system 100 is monitored.

The plurality of sensors 150 may be mounted on the vehicle 110 of the autonomous dispensing system 100, on static sensor posts 30 and/or on mobile mounts other than the vehicle 110. The difference in positioning of the sensors 150 and the nozzle 140 being known may be used to determine the position of the nozzle 140 relative to the target surface.

Collection of datapoints by the plurality of sensors 150 takes place over a period of time where one or more of the sensors 150 may move relative to the airplane 1. As more datapoints are collected the estimate of the relative positioning of the airplane 1 with respect to the autonomous dispensing system 100 becomes more accurate. Once a 3D representation of the surfaces of the airplane 1 to be treated has been determined, a path for dispensing of fluid is determined by the processing unit 160. The path may be generated from datapoints retrieved from the database 165, from datapoints detected on the surface or a combination thereof.

Alternatively, a predetermined path may be stored in the database 165 along with the data of the 3D representation, in such cases the path may be determined by the processing unit 160 by retrieving the predetermined path from the database 165 and translating it to the frame of reference matching the positioning of the airplane 1. Once the path is generated, the dispensing process is executed. The nozzle 140 is moved along the path while fluid is dispensed onto the target surfaces. The movement of the nozzle 140 being done by a combination of movement of the boom 120, the arm 130 and the vehicle 110. During the movement of the nozzle 140, sensors continuously monitor the distance between part of the autonomous dispensing system 100 mounted on the vehicle 110 and the airplane 1. The distance is monitored to minimise the risk of collisions, as the system may be stopped if the sensed distance becomes less than a threshold value.

Now follows a set of points, which constitute aspects of the present invention which may be considered independently patentable and as such the following sets form basis for possible future sets of claims:

1. A method for applying a fluid, such as de-icing fluid, to a surface of an airplane, said method comprising:
   providing said airplane, providing a vehicle loaded with said fluid, said vehicle having a nozzle for spraying said fluid onto said surface,
   providing a sensor and a processing unit for determining a 3D representation of said surface,
   determining said 3D representation by means of said sensor and said processing unit,
   determining a plurality of points of said surface such that each point having a distance to said 3D representation, said plurality of points arranged such that said surface being applied with said fluid when moving said nozzle through said plurality of points,
   moving said vehicle to a position for moving said nozzle through said plurality of points, and
   moving said nozzle through said plurality of points and applying said fluid to said surface as said nozzle being moved through said plurality of points.
2. The method according to point 1, comprising moving said vehicle while applying said fluid to said surface.
3. The method according to any of the preceding points, comprising determining a path for said vehicle along said surface.
4. The method according to any of the preceding points, comprising moving said vehicle autonomously along said path.
5. The method according to any of the preceding points, said vehicle being remote controlled by an operator at a location remote from said vehicle.
6. The method according to any of the preceding points, comprising determining a path through said plurality of points.
7. The method according to any of the preceding points, said 3D representation constituting a boundary condition for determining said plurality of points.
8. The method according to any of the preceding points, said boundary conditions being satisfied when the entirety of said path projected perpendicularly onto said surface is located between two extremes of said 3D representation such as a leading edge and a trailing edge of a wing of said airplane.
9. The method according to any of the preceding points, comprising parking said vehicle at a number of dispensing positions adjacent said airplane while applying said fluid to said surface, each dispensing position constituting a position at which said nozzle being arranged off said surface.
10. The method according to any of the preceding points, comprising determining said path such that said number of positions being minimized.
11. The method according to any of the preceding points, comprising determining said path such that the change of position of said nozzle is minimized.
12. The method according to any of the preceding points, comprising determining a first dispensing position at which the vehicle is at least temporarily stationary during the dispensing of fluid.

13. The method according to point 12, comprising making at least one sweep along said surface with said nozzle while said vehicle being stationary at a first dispensing position.
14. The method according to point 13, comprising determining said path such that the number of sweeps needed for applying said fluid to all of said surface being minimized.
15. The method according to any of the points 13-14, comprising making no more than seven sweeps, such as no more than three sweeps such as no more than two.
13. The method according to any of the preceding points, comprising determining the speed with which said nozzle moves along said path.
14. The method according to any of the preceding points, comprising determining adjustments of the dispensing angle of said nozzle relative to said surface depending on the position of said nozzle along said path.
15. The method according to any of the preceding points, comprising determining adjustment of fluid flow depending on the position of said nozzle along said path.
16. The method according to any of the preceding points, said path being determined before dispensing of said fluid from said nozzle commences.
17. The method according to any of the preceding points, comprising determining said 3D representation by sensing a plurality of datapoints of said surface and translating said datapoints to the same frame of reference.
18. The method according to any of the preceding points, comprising creating a SLAM map of said surface.
19. The method according to any of the preceding points, comprising segmenting clusters of said datapoints into segmented surfaces corresponding to parts of said airplane.
23. The method according to point 22, comprising determining which parts of said airplane that said segmented surfaces corresponds to by computing Ensemble of Shape Functions of said surfaces and comparing said ensemble of shape functions with signature functions corresponding to airplane parts.
20. The method according to any of the preceding points, comprising continuously monitoring a minimum distance from said vehicle to said airplane such that the method is ended before completion if said minimum distance becomes below a threshold value such that collision may be avoided.
21. The method according to any of the preceding points, said surface of said airplane being a wing.
22. The method according to any of the preceding points, comprising heating said fluid before dispensing of said fluid onto said surface.
23. A method for automatic de-icing a surface of an airplane, said method comprising any of the preceding points.
24. A method for applying a fluid, such as de-icing fluid, to a surface of an airplane, said method comprising:
providing said airplane,
providing a vehicle loaded with said fluid, said vehicle having a nozzle for spraying said fluid onto said surface,
providing a database including a set of 3D representations of surfaces of airplane models,
each 3D representation associated with an aircraft registration number,
determining the aircraft registration number of said airplane,
determining the 3D representation of said airplane by looking said aircraft registration number up in said database,
determining a plurality of points of said surface such that each point having a distance to said 3D representation, said plurality of points arranged such that said surface being applied with said fluid when moving said nozzle through said plurality of points,
moving said vehicle to a position for moving said nozzle through said plurality of points, and
moving said nozzle through said plurality of points and applying said fluid to said surface as said nozzle being moved through said plurality of points.
29. The method according to any of the points preceding point 28, comprising determining a path through said plurality of points.
30. The method according to any of the points preceding point 28, comprising providing a sensor for sensing at least two datapoints corresponding to said surface,
providing a processing unit for relating said datapoints to said pre-existing 3D representation,
retrieving one of said pre-existing 3D representations from said database, relating said at least two datapoints of said surface to said 3D representation by means of said processing unit such that the orientation of said 3D representation may be transferred to the reference frame of said airplane,
31. The method according to any of the points preceding point 28,
said 3D representation constituting a boundary condition for determining said path for moving said nozzle relative to said surface,
determining said path, along which said fluid is being applied to said surface when moving said nozzle along said path.
32. The method according to any of the points preceding point 28, determining a first end point of said path and translating said first end point from the reference frame of said 3D representation to the reference frame of said airplane such that said path based on said 3D representation will follow said surface of said airplane,
33. The method according to any of the points preceding point 28, said aircraft registration number constituting a tail number.
25. The method according to any of the preceding points, said boundary conditions being satisfied when the entirety of said path projected perpendicularly onto said surface of said 3D representation is located within the contours of said 3D representation projected onto the plane of said path.
26. The method according to any of the preceding points, said database comprising at least one predetermined path corresponding to at least one surface of at least one airplane model in said database.
27. The method according to any of the preceding points, comprising using Monte Carlo localization when determining the relative positioning of said surface and said nozzle.
28. A system for applying a fluid, such as de-icing fluid, to a surface of an airplane, said system comprising:
a vehicle for carrying and transporting other components of the system,
a container for storing said fluid, a nozzle for dispensing said fluid from said container onto said surface, said nozzle being fluidically connected to said container, a sensor and a processing unit for determining a 3D representation of said surface for determining a plurality of points off said surface such that each point having a distance to said 3D representation, said plurality of points arranged such that said surface being applied with said fluid when moving said nozzle through said plurality of points.

38. The system according to any of the points preceding point 37, comprising an arm for adjusting the position of said nozzle, said arm being connected to said nozzle by a nozzle joint,
a boom for adjusting the position of said nozzle, said boom being connected to said arm by an arm joint and said boom being connected to said vehicle by a boom joint, at least one actuator for moving said nozzle joint, said arm joint and said boom joint, 39. The system according to any of the points preceding point 37, comprising at least one sensor for detection of said surface and tracking of the position of said nozzle, at least one sensor being mounted at said nozzle joint, a processing unit for storing data detected by said at least one sensor and for determining application directions based on said data.

40. The system according to any of the points preceding point 37, comprising a sensor at said arm joint for sensing one or more datapoints corresponding to said surface and/or sensing the configuration of said arm joint.

41. The system according to any of the points preceding point 37, comprising a sensor at said boom joint for sensing one or more datapoints corresponding to said surface and/or sensing the configuration of said boom joint.

42. The system according to any of the points preceding point 37, comprising at least one sensor on a sensor post for sensing one or more datapoints corresponding to said surface, said sensor post being mounted away from said vehicle.

43. The system according to any of the points preceding point 37, said arm comprising at least one telescopic section for adjusting the length of said arm and adjusting the position of said nozzle.

44. The system according to any of the points preceding point 37, said boom comprising at least one telescopic section for adjusting the length of said boom and adjusting the position of said nozzle.

45. The system according to any of the points preceding point 37, comprising a database for storing 3D representations of airplanes and optionally predetermined paths.

46. The system according to any of the points preceding point 37, comprising a receiver for receiving transmitted data.

The invention claimed is:

1. A method for de-icing a surface of an airplane, said method comprising:
providing said airplane,
providing a vehicle loaded with a fluid, said vehicle having a nozzle for spraying said fluid onto said surface,
said vehicle comprising a first sensor for determining a position of said airplane,
providing a second sensor and a processing unit for determining a 3D representation of said surface by means of said second sensor and said processing unit, said 3D representation comprising a point cloud,
determining said 3D representation by means of said second sensor and said processing unit, and
translating the datapoints of said point cloud to a common reference frame by means of said first sensor and said processing unit,
determining a plurality of points off said surface such that each point having a distance to said 3D representation,
said plurality of points determined such that an area of said surface being de-iced by sweeping said nozzle through a number of points of said plurality of points one sweep at a time, and said plurality of points determined such that the number of sweeps being minimized,
moving said vehicle to a position for moving said nozzle through said plurality of points, and
moving said nozzle through said plurality of points and applying said fluid to said surface as said nozzle being moved through said plurality of points.

2. The method according to claim 1, comprising moving said vehicle while applying said fluid to said surface.

3. The method according to claim 1, comprising determining a path for said vehicle along said surface.

4. The method according to claim 1, comprising moving said vehicle autonomously along said path.

5. The method according to claim 1, said vehicle being remote controlled by an operator at a location remote from said vehicle.

6. The method according to claim 1, comprising determining a path through said plurality of points.

7. The method according to claim 1, comprising parking said vehicle at a number of dispensing positions adjacent said airplane while applying said fluid to said surface, each dispensing position constituting a position at which said nozzle being arranged off said surface.

8. The method according to claim 1, comprising determining said path such that said number of positions being minimized.

9. The method according to claim 1, said vehicle comprising a vehicle cabin for the operator of said vehicle, and said vehicle comprising a monitor or display for displaying an image of said surface, said display preferably arranged in or at said vehicle cabin, said image preferably generated as a function of said 3D representation.

10. The method according to claim 1, said display constituting a head up display for displaying said image in the viewpoint of said operator when said operator viewing said surface.

11. The method according to claim 1, comprising making at least one sweep along said surface with said nozzle while said vehicle being stationary at a first dispensing position.

12. The method according to claim 1, comprising determining said path such that the number of sweeps needed for applying said fluid to all of said surface being minimized, making no more than seven sweeps.

13. A method for de-icing a surface of an airplane, said method comprising:
providing said airplane,
providing a vehicle loaded with said fluid, said vehicle having a nozzle for spraying said fluid onto said surface,
said vehicle comprising a first sensor for determining a position of said airplane,
providing a database including a set of 3D representations of surfaces of airplane models, each 3D representation associated with an aircraft registration number, determining the aircraft registration number of said airplane, determining the 3D representation of said airplane by looking said aircraft registration number up in said database, said 3D representation comprising a point cloud, providing a processing unit and translating the datapoints of said point cloud to a common reference frame by means of said first sensor and said processing unit, determining a plurality of points off said surface such that each point having a distance to said 3D representation, said plurality of points determined such that an area of said surface being de-iced by sweeping said nozzle through a number of points of said plurality of points one sweep at a time, and said plurality of points determined such that the number of sweeps being minimized, moving said vehicle to a position for moving said nozzle through said plurality of points, and moving said nozzle through said plurality of points and applying said fluid to said surface as said nozzle being moved through said plurality of points.

14. A method for automatic de-icing a surface of an airplane, said method comprising the method of claim 13.

\* \* \* \* \*